US012611289B2

(12) United States Patent
Bonding et al.

(10) Patent No.: US 12,611,289 B2
(45) Date of Patent: Apr. 28, 2026

(54) METHOD AND SYSTEM FOR SCANNING MULTIPLE DENTAL OBJECTS

(71) Applicant: 3SHAPE A/S, Copenhagen K (DK)

(72) Inventors: Morten Bo Bonding, Copenhagen K (DK); Sergey Mescherinov, Copenhagen K (DK)

(73) Assignee: 3Shape A/S, Copenhagen K (DK)

( * ) Notice: Subject to any disclaimer, the term of this patent is extended or adjusted under 35 U.S.C. 154(b) by 356 days.

(21) Appl. No.: 18/067,108

(22) Filed: Dec. 16, 2022

(65) Prior Publication Data

US 2023/0190424 A1     Jun. 22, 2023

(30) Foreign Application Priority Data

Dec. 20, 2021     (DK) ........................... PA 2021 70637

(51) Int. Cl.
A61C 9/00          (2006.01)

(52) U.S. Cl.
CPC .......... A61C 9/0053 (2013.01); A61C 9/0006 (2013.01)

(58) Field of Classification Search
CPC ..... A61C 9/0053; A61C 9/0006; A61C 9/006; A61C 19/04; A61C 13/0004; A61B 5/0088; A61B 5/0062; A61B 2018/20353; G06T 17/00; G06T 2207/30036; G16H 30/00; G16H 50/50
See application file for complete search history.

(56) References Cited

U.S. PATENT DOCUMENTS 10,481,379  B1 *  11/2019  Putman .............. G02B 21/0032
2011/0090513  A1      4/2011  Seidl et al.
(Continued)

FOREIGN PATENT DOCUMENTS

DE          4301538  A1    7/1994
DE    202006011022  U1   12/2007
DE    102014212231  A1   12/2015
(Continued)

OTHER PUBLICATIONS

N. Cory Glenn. Scanning alginate impressions. YouTube, Sep. 19, 2017, retrieved Jul. 7, 2022. https://www.youtube.com/watch?v=IrKWctJdsO8.
(Continued)

*Primary Examiner* — Chong Wu
(74) *Attorney, Agent, or Firm* — BUCHANAN INGERSOLL & ROONEY PC

(57)          ABSTRACT
A three-dimensional optical scanning system for scanning a three-dimensional dental object, the system including a first scanning station configured to receive a first three-dimensional dental object, and further configured to rotate around a first axis during the scanning; and an imaging unit including at least one camera and configured to rotate around an imaging unit axis during the scanning, wherein the optical scanning system is configured such that the imaging unit acquires a plurality of two-dimensional images of the first three-dimensional dental object corresponding to a set of predefined static relative positions between the imaging unit and the first scanning station for generating a first three-dimensional digital representation of the first three-dimensional dental object.

15 Claims, 5 Drawing Sheets

(56) References Cited

U.S. PATENT DOCUMENTS

2016/0113728 A1* 4/2016 Piron .................... A61B 34/30
                                                    606/130
2022/0313401 A1 10/2022 Suh et al.

FOREIGN PATENT DOCUMENTS

| EP | 0600800 | A1 | 6/1994 |
| KR | 20210082884 | A | 7/2021 |
| WO | 2021053338 | A1 | 3/2021 |

OTHER PUBLICATIONS

Zahn Dental. Dental Lab Life: Scanning a Crown in 3Shape. YouTube—Jun. 6, 2018, retrieved on Jul. 7, 2022. https://www.youtube.com/watch?v=-Iz74jGsF8.
The extended European Search Report issued on May 16, 2023, by the European Patent Office in corresponding European Application No. 22213689.7. (8 pages).

* cited by examiner

701

705

703

701

705

703

701

703

705

METHOD AND SYSTEM FOR SCANNING MULTIPLE DENTAL OBJECTS

FIELD

The disclosure relates to a three-dimensional optical scanning system configured to scan a dental object positioned at a scanning station.

BACKGROUND

The three-dimensional (3D) dental scanner is a device that is used to scan a three-dimensional physical dental object for generating a 3D digital representation of the dental object. This is performed by acquiring a plurality of two-dimensional (2D) images of a three-dimensional dental object in response to illumination of the dental object, followed by processing of the acquired images to generate the three-dimensional digital representation. One such three-dimensional dental scanner is a desktop dental scanner, which includes a scanning station on which the dental object is placed. During scanning, the scanning station having the dental object placed thereon is moved and the dental object is illuminated with a probe light. The light reflected in response to the illumination, corresponding to the 2D images, is acquired at a camera of the dental scanner. The acquired 2D images are then processed to generate the three-dimensional digital representation of the dental object.

As the camera and the 3D dental object move in relation to each other, the camera may acquire 2D images of the 3D dental object. The scanning procedure may take a long time, especially when the 3D dental object has a complex structure such as present in a dental impression.

What is necessary for a generating a reliable 3D digital representation of the dental object based on the plurality of 2D images of the dental object, is that relevant aspects of the dental object (i.e dental information) are optimally acquired during scanning and represented in the acquired plurality of 2D images. In some scenarios, the physical dental object may include different sides with more than one side comprising dental information, such as opposing sides of a dental impression. Using conventionally known desktop scanners for acquiring dental information from different sides is rather inefficient. For example, scanning different sides may require a manual intervention by way of a user physically repositioning the dental object at the scanning station to allow different sides to become visible to the probe light and camera.

The disclosure provides a novel optical scanning system for scanning at least one three-dimensional physical object. The disclosed optical scanning system also overcomes the challenge(s) associated with the existing desktop scanner.

SUMMARY

Within the context of the present application, the term "first three-dimensional dental object" includes any of a triple tray, a die comprising a positive model of teeth having one or more prepared teeth, a single die comprising a positive model of a prepared tooth, a multi die comprising a plurality of (single) dies, or a model of some teeth or a set of teeth, where the model may be a gypsum teeth model. These dental objects represent different types of dental object. For example, a single die represents a dental object type, which is different from a dental object type such as triple tray. As an example, one or more single dies fall in the same category of dental object type. One or more triple trays fall into the same category of dental object type, which is different from the dental object type categorizing one or more single dies. Similarly, other dental objects may be categorized as a distinct dental object type.

Within the context of the present application, the term "triple tray" should be understood to include an impression made from a patient's teeth, preferably the triple tray comprises the impressions from teeth both upper jaw and lower jaw of the patient.

The disclosure provides an optical scanning system for scanning a three-dimensional dental object with an improved scanning workflow, a reduced duration of scanning time, and optionally the whole scanning process is automatic. One of more of these effects may be achieved by means of a system according to claim 1.

According to an embodiment, a three-dimensional optical scanning system for scanning a three-dimensional dental object is disclosed. The system includes a first scanning station configured to receive a first three-dimensional dental object, and further configured to rotate around a first axis during the scanning; and an imaging unit comprising at least one camera and configured to rotate around an imaging unit axis during the scanning. The optical scanning system is configured such that the imaging unit acquires a plurality of two-dimensional images of the first three-dimensional dental object corresponding to a set of predefined static relative positions between the imaging unit and the first scanning station for generating a first three-dimensional digital representation of the first three-dimensional dental object.

If a 3D dental object position on the scanning station and the imaging unit are moved in relation to each other during scanning whereby only one of the scanning station or imaging unit is moved, and the 2D images are captured every so often e.g. at a certain rate, the scanning process may typically take a long time and may also struggle to capture dental information from different sides. In contrast, by using a set of predefined static relative positions, both overlap of the acquired 2D images and number of 2D images needed to capture to obtain same data to generate the first 3D digital representation may be optimized. This will save time and it will also reduce the amount of data that needs to be processed. The reduced amount of data will further reduce the necessary time, and also the power needed for processing the data. If the processing or at least a part of the processing of the 2D images for generating the first 3D digital representation is performed at a remote central location, e.g. in the cloud, processing time will reduce the waiting time for another 3D optical scanning system for generating its first 3D digital representation.

In an embodiment, the set of predefined static relative positions can be selected from a plurality of sets of predefined static relative positions between the imaging unit and the first scanning station.

The set of predefined static relative positions that is suitable or optimal for one first 3D dental object type may not necessarily be suitable or optimal for another first 3D dental object type, and vice versa. For example, the set of predefined static relative positions for a triple tray of a child and an adult may not be the same. The set of predefined static relative positions for a triple tray or for a single die may vary. The system may be configured to choose the correct set of predefined static relative positions for a 3D dental object, like a triple tray or a single die, and even for the same dental object, the static relative positions may also be different depending on classes such as age, ethnicity. The system may include a memory containing the plurality of static relative positions for different dental object types and/or static relative positions for different dental objects corresponding to different classes representing aspects other than object type, eg. patient characteristics such as age. For scanning, the system may be configured to use applicable static relative positions from the memory, for example in response to the knowledge of first 3D dental object type is to be scanned, wherein the age or the age group is provided by a user of the system.

To have a plurality of sets of predefined static relative positions, e.g. one set for each type of first 3D dental object, and e.g. for each type of first 3D dental object one set for each age group and/or for each size group, will enable the user to choose or the system to automatically determine the correct set of predefined static relative positions for the first 3D dental object to be scanned, so that the first 3D digital representation is generated, which corresponds very well to the first 3D dental object, in a short time. The automatic determination may include acquiring a set of 2D test images of a physical dental object positioned at the scanning station from object-independent static relative positions, optionally generating a rough 3D model of the physical dental object based on the set of 2D test images and applying image recognition techniques such as feature recognition techniques on the set of 2D test images or optionally on the rough 3D model to identify type of the dental object.

The first 3D dental object positioned on the first scanning station is preferably only rotated not translated. This offers an advantage when the first 3D dental object in a tilted orientation since the tilting is desired to be maintained throughout the scanning procedure. Translating may risk the tray moving slightly due to the gravitational force, thus risking inaccurate capturing of the 2D images.

In an embodiment, each predefined static relative position from the set of predefined static relative positions may include a pairing of a first predefined static rotational position of the first scanning station around a first axis with a second predefined static rotational position of the imaging unit around an imaging unit axis.

As an example, if the predefined static rotational positions of the first scanning station include stationary positions around the first axis and the predefined static rotational positions of the imaging unit includes 4 stationary positions around the imaging axis, then the predefined static relative positions would include 20 positions (i.e. 5×4 positions) at which the plurality of 2D images of the dental object to be scanned are captured.

In an embodiment, a selection of the set of predefined static relative positions from the plurality of sets of predefined static relative positions may be based on a dental object type of the first 3D dental object. The static relative positions corresponding to the dental object type may determine the directions from which the imaging unit has to acquire the plurality of 2D images. One dental type will have concave, convex and flat surfaces at certain positions and another dental type will have concave, convex, and flat surfaces at certain other positions. Where the concave, convex and flat surfaces are positioned will determine, what should be the predefined static relative positions for the certain dental object type so that acquired plurality of 2D images, covering the dental information, provides reliable data for generation of the digital 3D representation of the dental object.

In an embodiment, the set of predefined static relative positions includes intermediate predefined static rotational positions of the imaging unit between two extreme positions around the imaging unit axis. The predefined static rotational positions of the imaging unit may additionally include one or both of two extreme positions around the imaging unit axis, i.e. intermediate predefined static rotational positions of the imaging unit between two extreme positions and at least one of the two extreme positions around the imaging unit axis.

In an embodiment, the imaging unit is configured to move between two extreme positions that are spaced apart around the imaging unit axis by a predefined angle. The two extreme positions are at least 100° apart, preferably at least 120° apart, even more preferably at least 140° apart, and most preferably at least 160° apart. That the imaging unit can move more than 100° and even more than 120° means such that the imaging unit can move, during the rotation, beyond a top position that is exactly vertically above the first scanning station. Allowing the imaging unit to go beyond the position allows for capturing the dental information from different sides of the first dental object faster. The static rotational positions of the imaging unit around the imaging axis include at least one static position on either side of the top position. Therefore, during scanning, the imaging unit is configured to rotate around the imaging axis such that the imaging unit crosses the first axis around which the scanning station is configured to rotate.

In an embodiment, the two extreme positions are substantially symmetrically apart from the first axis. In other words, a first rotational distance between a first extreme position and the top position that is exactly vertically above the first scanning station is equal to a second rotational distance between a second extreme position and the top position that is exactly vertically above the first scanning station.

In an embodiment, at least one of the predefined static rotational positions of the imaging unit and/or at least one of the predefined static rotational positions of the first scanning station can be based on previous cases comprising dental objects corresponding to the first 3D dental object. Before the scanning system can be used for scanning the first 3D dental object, the predefined static relative positions for a certain dental object type are determined so that the determined static relative positions can be later be used to scan dental object of same dental object type, which will save time. The determination may be manual or automatic such as using machine learning.

In one embodiment, the manual determination may be based on manual comparison of 3D digital representation of a test physical dental object of a specific dental object type at different candidate static relative positions with respect to a reference scan of the test physical dental object. The candidate static relative positions for the dental object type are selected as static relative positions for later scanning of same dental object types, if manual comparison shows a satisfactory result based on the criterion comprising difference between the digitally generated 3D dental model of the test physical dental object and the reference scan below an acceptable value or within a range.

In an embodiment, the at least one of the predefined static rotational positions of the imaging unit and/or the at least one of the predefined static rotational positions of the first scanning station can be determined using machine learning. In an example, a training data set comprising input-output pair may be used. The input-output pair may include a physical dental object of a certain object type as input data and a reference digital scan of the physical dental object as the output data, which is used as a target data in the training session. Using this training data for the dental object may allow for identifying static relative positions between the scanning station and imaging unit, thereby training a neural network. During scanning, the scanning system running the trained neural network is configured to capture images at the static relative positions for the dental object that corresponds to the object type used in the training session.

In an embodiment, the first scanning station can comprise a platform that is configured to receive the first 3D dental object in a first orientation. The platform may be a separable component from the first scanning station, the platform is configured to be attached to the first scanning station.

The platform may include a plate having connecting component configured to clamp and secure a foot section of the dental object to be scanned. Preferably, one dental object type (e.g. the triple tray) can be positioned on the platform via clamping in the same first orientation and another dental object type (e.g. the single die) can be positioned on the platform in the same second orientation such that, during scanning, the orientation of the object remains the same in relation to respective scanning station on which the object is positioned.

In an embodiment, the first scanning station can comprise a platform that is configured to receive the first 3D dental object in a first orientation, such that patient dental information or all patient dental information comprised on each of opposite sides of the first 3D dental object is exposed based on the set of predefined static relative positions. For example, triple tray having patient's impression data from upper and lower jaws may be present on opposite sides of the triple tray.

If the first 3D dental object is a triple tray having a full or partial U-shaped form with a tray axis through the bottom centre of generally U-shaped triple tray, the tray axis for full U-shaped form being equidistant from corresponding points on two arms of the generally U-shaped triple tray. In one embodiment, the first orientation such that the tray axis is substantially coinciding or parallel with the first axis. In another embodiment, the first orientation is such that the tray axis is substantially perpendicular with the first axis.

If the first 3D dental object is a single die having an axis of symmetry (e.g. long axis) through the centre of the single die, the first orientation is such that the axis of symmetry is parallel (e.g. coincident) or at an angle with the first axis.

In an embodiment, the first 3D dental object can be a single die and a coronal direction of the single die in the first orientation can be directed generally upwards away from the scanning station. The angle between the axis of symmetry and the first axis may less than 30°, preferably less than 20°, more preferably less than 10°.

In an embodiment, the first 3D dental object can be a triple tray and wherein the triple tray in the first orientation can have a dental midline that is parallel or at an angle with the first axis. In another embodiment, the first 3D dental object can be a triple tray and wherein the triple tray in the first orientation can have a dental midline that is parallel or at an angle surface of the scanning station on which the platform is arranged. In either embodiment, the angle may less than 30°, preferably less than 20°, more preferably less than 10°.

In an embodiment, the plurality of predefined static relative positions can comprise predefined static rotational positions of the first scanning station. Adjacent predefined static rotational positions may be spaced apart in discrete multiples of a first angle around the first axis. The first angle may be more than 10°, preferably more than 20°, more preferably more than 30°, and most preferably more than 40° such as 72°.

In an embodiment, the plurality of predefined static relative positions can comprise predefined static rotational positions of the imaging unit. Adjacent predefined static rotational position may be spaced apart in discrete multiples of a second angle around the imaging unit axis. The second angle may be more than 10°, preferably more than 20°, more preferably more than 30°, and most preferably more than 40° such as 90°.

In an embodiment, the system can be configured to keep the imaging unit and the first scanning station at stationary states when at respective predefined static rotational positions during acquisition of the plurality of 2D images of the first 3D dental object. At acquisition of the 2D images of the first 3D dental object during the scanning session, the imaging unit and scanning stations are brought to rest and not move in relation to each other. This allows for the acquired 2D image be sharp as movement-based vibrations or blur is reduced, thereby allowing for a reliable 3D model.

At each static relative position between the first scanning station and imaging unit, one or more 2D images of the first dental object may be acquired. Each relative static position offers a different direction of view from the imaging unit, e.g. at least one camera, of the physical dental object, thereby allowing for capturing different dental information from the physical dental object.

The system is configured to acquire one or more 2D images for a predefined static relative position before changing to another predefined static relative position where another one or more 2D images are acquired. In one embodiment, the system is configured to rotate the imaging unit to a predefined static rotational position around the imaging axis and to rotate the first scanning station to different predefined static rotational positions around the first axis when the imaging unit is stationary at the predefined static rotational position, prior to rotating the imaging unit to a subsequent predefined static rotational position around the imaging axis and to rotate the first scanning station to the different predefined static rotational positions around the first axis when the imaging unit is stationary at the subsequent predefined static rotational position. This is useful because the imaging unit is usually a heavier unit compared to the scanning station having the dental object placed thereon, and this approach ensures that the heavier unit is rotated lesser number of times than the lighter scanning station during the scanning session. In another embodiment, the system is configured to rotate the first scanning station to a static rotational position around the first axis and to rotate the imaging unit to different predefined static rotational positions around the imaging axis when the scanning station is stationary at the static rotational position, prior to rotating the first scanning station to a subsequent predefined static rotational position around the first axis and to rotate the imaging unit to the different predefined static rotational positions around the imaging axis when the first scanning station is stationary at the subsequent predefined static rotational position. This is useful because the scanning station includes a dental object placed thereon and this approach ensures that the dental object is rotated lesser number of times during the scanning session, thereby reducing likelihood of the dental object moving with respect to the scanning station.

In an embodiment, prior to rotating the imaging unit to a subsequent predefined static rotational position around the imaging unit axis, the imaging unit is configured to acquire at least one two-dimensional image of the first three-dimensional dental object for each predefined static rotational positions of the first scanning station.

In an embodiment, the system can be configured to acquire different 2D images for each of the set of predefined static relative positions with the same position of the first scanning station before moving the first scanning station to another position. For some reason, the first 3D dental object may be difficult to securely adhere well to the first scanning station and the first 3D dental object may move in relation to the first scanning station during acquisition of the 2D images. If that is the case, it will be faster if different 2D images are acquired for different positions of the imaging unit and for the same position of the first scanning station, before the first scanning station is moved to another position.

In an embodiment, the system can be configured to acquire different 2D images for each of the set of predefined static relative positions with the same position of the imaging unit before moving the imaging unit to another position. The imaging unit is typically heavier than the first scanning station and for that reason the imaging unit may be slower to move around the imaging unit axis than the first scanning station around the first axis. Therefore, it will be faster if different 2D images are acquired for different positions of the first scanning station and for the same position of the imaging unit, before the imaging unit is moved to another position. This is generally useful because the first scanning station usually takes short time to move around than rotation of the imaging unit.

In an embodiment, the rotational speed of the first scanning station and/or of the imaging unit can be varied. The system may include vibration sensor that is configured to measure the vibration of the scanning station during scanning. In an embodiment, the rotational speed can be varied from a user interface, like computer screen, esp. when the vibration signal indicating a value beyond a threshold value. In another embodiment, the rotational speed can be varied automatically in response to the vibration signal indicating a value beyond a threshold value. Varying the rotational speed of the first scanning station and/or of the imaging unit allows for tuning the scanning process of the 3D dental object to be as fast as possible without causing vibrations and unnecessary wear. Additionally or alternatively, if the vibration signal is beyond the threshold value, this may also likely be because of the dental object not adhered properly to the first scanning station. Thus, the first dental object may be re-attached to adhere the object more securely on the first scanning station if the vibration signal is beyond the threshold value. As mentioned above, if the first 3D dental object is not well-adhered to the first scanning station, it will be preferable to lower the rotational speed of the first scanning station and/or re-attach the first 3D dental object.

In an embodiment, the system further can comprise a first motor and an imaging unit motor, wherein the system can be configured to control the first motor to rotate the first scanning station around the first axis and to control the imaging unit motor to rotate the imaging unit around the imaging unit axis independently. In an embodiment, the first motor and the imaging unit motor be the same motor that is configured to sequentially rotate the first scanning station and imaging unit.

In an embodiment, the system can further comprise a control unit configured to control rotation of the first scanning station around the first axis and the imaging unit around the imaging unit axis. The control unit can control the first motor and/or the imaging unit motor, independently.

In an embodiment, for each predefined static rotational position of the imaging unit, the control unit is configured to instruct the first motor to rotate the first scanning station sequentially to each of the plurality of predefined static rotational positions of the first scanning station. In another embodiment, for each predefined static rotational position of the scanning station, the control unit is configured to instruct the imaging unit motor to rotate the imaging unit sequentially to each of the plurality of predefined static rotational positions of the imaging unit.

In an embodiment, the system can further comprise a memory configured to store the set of predefined static relative positions, or preferably the plurality of sets of predefined static relative positions, where each set corresponds to specific to a dental object type corresponding to the first 3D dental object. The memory can be updated by storing a set of predefined static relative positions for yet another type of a first 3D dental object.

When a certain type of the first 3D dental object is positioned on the first scanning station, the system is configured to select a set of predefined static relative positions for that certain type of the first 3D dental object from the memory and to control movement of the imaging unit and of the first scanning station during the scanning session.

In an embodiment, the system further comprises a processor configured to access the memory and to apply, during the scanning, the stored set of static relative positions in response to identification of a dental object type corresponding to the first 3D dental object.

In one embodiment, the identification of the dental object type of the first 3D dental object is manual with the user selecting the dental object type on a user interface. In another embodiment, the identification of the dental object type of the first 3D dental object is automatic. The automatic determination may include acquiring a set of 2D test images of a physical dental object positioned at the scanning station from object-independent static relative positions, optionally generating a rough 3D model of the physical dental object based on the set of 2D test images and applying image recognition techniques such as feature recognition techniques on the set of 2D test images or optionally on the rough 3D model to identify type of the dental object.

In an embodiment, the system can further comprise at least one light source configured to emit light for illuminating the received first 3D dental object. In an embodiment, the light e.g. from the light source can comprise structured light that is configured to be projected onto the first 3D dental object. The structured light is reflected by the first 3D dental object and acquired by the imaging unit as the plurality of 2D images of the first 3D dental object. The scanning may be employed by way of different scanning principles such as triangulation, focus scanning, confocal techniques or any other known techniques. For example, in triangulation-based scanning, a known fixed geometric relation between at least one light source and at least one camera of the imaging unit and distortion of the pattern of structured light, as obtained from the dental object in response to illumination of the dental object using structured light, would capture 2D images corresponding to three dimensional shape of the first 3D dental object.

In an embodiment, the structured light can have a pattern corresponding to at least one of a physical structure introduced in a light path between the at least one light source and the first 3D dental object. Alternatively, the structured light may be a digitally generated light pattern. The structured light may even be generated based on a relative arrangement of more than one light source representing the at least one light source. The arrangement of the light sources can create a pattern. An array of LEDs can e.g. be arranged such that the array of LEDs together form a pattern of more intensive light and less intensive light.

In an embodiment, the system includes a second processor that is configured to generate processed data by processing the plurality of two-dimensional images. The second processor may be part of the scanner and may include processing that prepares the acquired 2D images for transmission for example to a third processor. The first three-dimensional digital representation of the first three-dimensional dental object is generated based on the processed data.

In an embodiment, the system can comprise a third processor, which may be a processor remote from the scanner comprising the imaging unit and scanning station. The third processor is configured to generate the first three-dimensional digital representation of the first three-dimensional dental object is generated based on the plurality of two-dimensional images or processed data, which is generated by the second processor. The plurality of two-dimensional images or processed data may be converted into 3D digital representation by way of known stitching, also known as registration, process. The Iterative Closest Point (ICP) algorithm is widely used for this purpose. The third processor can be a remote processor and preferably a remote processor in the clouds, which will be especially advantageous if the processing of the plurality of 2D images is very computationally intensive.

In an embodiment, the first axis can be substantially vertical to surface of the scanning station. The first axis can be substantially vertical during use of the system, which ensure that the effect of gravity is minimized to influence the 3D dental object during rotation around the first axis.

In an embodiment, the system can comprise a base station comprising the first scanning station that is arranged on the base station, wherein the base station is configured to rotate around a third axis.

In an embodiment, the first scanning station is at a fixed distance from the third axis of rotation. As the first scanning station rotates around the first axis and the base station rotates around the third axis, the first scanning station is maintained at a fixed distance from the third axis of rotation.

In an embodiment, the fixed distance is the shortest distance along a lateral surface of the base station, wherein the lateral surface can comprise a surface on which the first scanning station can be arranged.

In an embodiment, the fixed distance between the first scanning station and the third axis of rotation can comprise the shortest distance between the first axis and the third axis.

In an embodiment, the first axis and the third axis can be substantially parallel.

In an embodiment, the system can comprise a second scanning station arranged on the base station, the second scanning station being configured to receive a second 3D dental object and to rotate around a second axis during scanning of the second 3D dental object. The first scanning station and the second scanning station can receive dental objects that are inter-related, i.e. dental objects relating to the same patient (a triple tray and a single die) so that both the first dental object and second dental object can be scanned in the same procedure preferably automatically, i.e. without any manual intervention, after the scanning of one of the dental objects starts. This way, the user doesn't have to control the system during scanning and can use his or her time on something else more important. The second scanning station can have any of and/or any combination of and/or all of the embodiments as descried regarding the first scanning station.

As indicated earlier, the static relative positions depend on the dental object type. Therefore, the static relative positions for the first dental object positioned on the first scanning station is likely at least partly different from the static relative positions for the second dental object positioned on the second scanning station.

In an embodiment, the second scanning station can be at a fixed distance from the first scanning station, the fixed distance being defined by a distance between the first axis and the second axis.

In an embodiment, the first axis and the second axis can be substantially parallel.

In an embodiment, the first scanning station can comprise a first scanning station surface configured to receive the first 3D dental object, wherein the first axis and a normal to the first scanning station surface can be at least substantially parallel.

In an embodiment, the first axis can be non-parallel to the imaging unit axis.

In an embodiment, the first axis can be substantially perpendicular to the imaging unit axis, which means that 2D images of all areas of interest of the first 3D dental object can be acquired, where the imaging unit is just above the area.

In an embodiment, the first scanning station can be prevented from rotating around an axis perpendicular to the first axis.

In an embodiment, the first scanning station can be restricted to rotate only around the first axis and/or third axis.

In an embodiment, the base station can be restricted to rotate only around the third axis.

In an embodiment, the imaging unit can be restricted to rotate only around the imaging unit axis.

In an embodiment, the imaging unit can be configured to define a scan volume through rotation of the imaging unit around the imaging unit axis during the scanning.

In an embodiment, the predefined static relative positions can comprise predefined static rotational positions of the imaging unit operationally paired with predefined static rotational positions of the first scanning station, wherein the defined scan volume can comprise a plurality of separate scan volumes, wherein each separate scan volume can correspond to each predefined static rotational position of the plurality of predefined static rotational positions of the imaging unit.

In an embodiment, the scan volume can comprise field of views of the imaging unit positioned at the plurality of predefined static rotational positions along the rotational path around the imaging unit axis.

In an embodiment, the imaging unit can comprise two or more cameras; and the scan volume can comprise at least partly overlapping field of views of the two or more cameras.

In an embodiment, knowing the positions of the two or more cameras, the position of a surface level of the 3D dental object can be determined using triangulation. The imaging unit, like the at least one camera, and the at least one light source can be in a predefined spatial relation with respect to each other.

The scan volume may include at least partly overlapping field of views of the two or more cameras, where the scan volume may correspond to the volume of the first 3D dental object.

In an embodiment, the imaging unit can be configured to capture the projected pattern of the structured light and/or distortion thereof, wherein the captured projected pattern and/or distortions thereof can correspond to the static relative positions and the predefined spatial relation between the imaging unit and the first scanning station.

In an embodiment, the third motor is configured to rotate the base station around the third axis.

The third motor may be the first motor and/or second motor, so that one motor can drive both the base station and first scanning station and/or second scanning station. The control unit may control which one by engaging the motor with the at least one of the first scanning station, second scanning station or with the base station.

In an embodiment, the control unit can be configured to control the third motor to prevent rotation of the base station around the third axis during the scanning of the first 3D dental object.

In an embodiment, the optical scanning system (e.g. control unit) can be configured to control the third motor to rotate the base station around the third axis to bring the second scanning station within the scan volume after acquisition of the plurality of 2D images of the first 3D dental object received at the first scanning station.

In an embodiment, the base station can be configured to be stationary during the scanning of the first 3D dental object or the second 3D dental object, i.e. when the scanning of the dental object occurs by placing the imaging unit and scanning station at static relative positions.

In an embodiment, the system can be configured such that at the predefined static relative positions the focus of the imaging unit within the scan volume can be limited to the first 3D dental object positioned at the first scanning station and/or only part of the base station.

In an embodiment, the system can comprise a partially open structure comprising one or more side surfaces and at least one opening. The at least one opening includes at least one side where the scanner surface is missing. The at least one opening is configured to allow positioning of the at least one of the first dental object or second dental object at the first scanning station or second scanning station respectively.

In an embodiment, the system comprises a partially open structure comprising one or more surfaces and at least one opening, the imaging unit comprises the at least one light source. The system may be configured for controlling the imaging unit such that during the rotation of the imaging unit around the imaging unit axis, the light from the at least one light source can be restricted to be directed towards one or more surfaces, such as directed towards the one or more side surfaces and base station, of the partially open structure, and/or field of view of the imaging unit can be restricted to be faced towards the one or more surfaces, such as directed only towards the one or more side surfaces and base station, of the partially open structure.

The term "restricted to be directed" may be defined as a not absolute restriction because there will be stray lights from open sides such as the at least one opening but the positioning can be such to limit the stray light.

The term "restricted to be faced" may be defined as relating to the focus of the at least one camera of the imaging unit.

In an embodiment, the control unit can be configured to control the third motor to rotate the base station around the third axis such that, prior to scanning of the first 3D dental object, the first scanning station of the plurality of scanning stations can be brought within the scan volume.

In an embodiment, the optical scanning system can be configured to rotate the base station around the third axis to sequentially bring the first scanning station and the second scanning station within the scan volume; and wherein the optical scanning system can be configured such that the imaging unit acquires a plurality of second 2D images of the second 3D dental object corresponding to a second set of predefined static relative positions between the imaging unit and the second scanning station for generating a second 3D digital representation of the second 3D dental object.

In an embodiment, the set of predefined static relative positions and the second set of predefined static relative positions can be same or at least partly different in comparison to the first set of the predefined static relative positions.

In an embodiment, the processor can be configured to generate a second 3D digital representation of the second 3D dental object based on the plurality of second 2D images of the second 3D dental object.

In an embodiment, the first 3D dental object and the second 3D dental object typically correspond to a same patient and can be a triple tray impression and a single die of said same patient.

According to an embodiment, a three-dimensional optical scanning system for scanning a three-dimensional dental object is disclosed. The system includes a base station configured to receive a three-dimensional dental object in at least one position; and an imaging unit comprising at least one camera and configured to rotate around an imaging unit axis during the scanning of the dental object. The optical scanning system is configured such that the imaging unit acquires a plurality of two-dimensional images the three-dimensional dental object corresponding to a set of predefined static rotational positions of the imaging unit around the imaging axis when the three-dimensional dental object is in the at least one position for generating a three-dimensional digital representation of the three-dimensional dental object. The three-dimensional dental object may include a physical dental articulator with model of patient's upper and/or lower jaw placed therein. In case both jaws are placed in the articulator, the upper and lower jaws are arranged in an occlusal relation defining occlusion of the patient's jaws. In one embodiment, the at least one position may include the dental articulator in a lying down position with a hinge axis of the physical dental articulator being spatially separated and parallel or non-parallel to the imaging unit axis. In another embodiment, the at least one position may include the dental articulator in a lying down position such that the imaging unit, at the first extreme position, faces posterior teeth in a quadrant of the model of patient's upper and/or lower jaw placed in the physical dental articular and the imaging unit, at the second extreme position, faces posterior teeth in another quadrant of the model of patient's upper and/or low jaw placed in the physical dental articular. The at least one position is such that during rotation of the imaging unit around the imaging unit axis, the imaging unit moves from the first extreme position to the second extreme position and the at least one camera of the imaging unit focuses on different teeth in the quadrant and another quadrant. The at least one position may include i) a first position where in the lying down position of the dental articulator, posterior teeth in the quadrant are closer to a side surface of the scanner and posterior teeth in the another quadrant are distal from the side surface of the scanner, and ii) a second position that is separated from the first position by 180 degrees, i.e. a second position where in the lying down position of the dental articulator, posterior teeth in the another quadrant are closer to a side surface of the scanner and posterior teeth in the quadrant are distal from the side surface of the scanner. The optical scanning system is designed such that a distance between the base station and imaging unit along rotational path of the imaging unit around the imaging unit axis is more than width of the dental articulator. The width may include a distance from the base station to the most distal point of the dental articulator towards the imaging unit when the dental articulator is in the lying position on the base station. The base station may include detachable at least one scanning station, such as the disclosed first scanning station or second scanning station as disclosed earlier. Thus, the same scanner may be used in combination with the scanning stations to scan inter-related dental objects, as described earlier. The skilled person would appreciate that one or more embodiments described earlier may be employed in this embodiment. For example, the scanner comprises a partially open structure comprising one or more surfaces and at least one opening, the imaging unit motor is configured to rotate the imaging unit, the light from the at least one light source can be restricted to be directed towards one or more surfaces, etc.

Scanning Process

In an embodiment, the first dental object may include a triple tray having dental information on two opposite sides and is positioned at the first scanning station in a first orientation. During the scanning process of the first dental object, each side of the first 3D dental object, e.g. a triple tray, is scanned by acquiring one or more 2D images of the first dental object when the first scanning station having the first 3D dental object and the imagining unit are at different static relative positions that corresponds to the first dental object type. For example, the imaging unit is brought to a first predefined static rotational position around the imaging axis. At the first predefined static rotational position, the imaging unit comprising at least one camera is configured to acquire one or more 2D images for each of different predefined static rotational positions, around the first axis, of the first scanning station. Thereafter, the imaging unit is brought to a subsequent predefined static rotational position around the imaging axis until the imaging unit is rotated to all predefined rotational positions around the imaging axis. At each of the subsequent predefined static rotational position, the imaging unit comprising at least one camera is configured to acquire one or more 2D images for each of different predefined static rotational positions, around the first axis, of the first scanning station. The acquired 2D images of the first dental object is used to generate 3D digital representation of the first dental object.

Additionally, the second scanning station may further include a second dental object such as a single die related to first dental object, i.e. for the same patient. After the plurality of 2D images of the first dental object are acquired, e.g. when one or more 2D images are acquired for static relative positions corresponding to the first dental object type, the base station is configured to, preferably automatically, rotate around the third axis to bring the second scanning station comprising the second dental object within the scan volume. The determination whether scanning of the first dental object is completed may be performed in different ways, e.g. the system may be configured to determine whether 2D images for all static relative positions corresponding to the first dental object are acquired, or the system may be configured to determine or it may be manually determined whether the 3D digital representation of the first dental object is satisfactory. The former is a quicker as the scanning of the second dental object does not need to wait for generation of the digital representation of the first dental object, whereas the latter one may be more reliable as far as evaluation process is concerned.

During the scanning process of the second dental object, each side of the second 3D dental object is scanned by acquiring one or more 2D images of the second dental object when the second scanning station having the second 3D dental object and the imaging unit are at different static relative positions that corresponds to the second dental object type. For example, the imaging unit is brought to a first predefined static rotational position around the imaging axis. At the first predefined static rotational position, the imaging unit comprising at least one camera is configured to acquire one or more 2D images for each of different predefined static rotational positions, around the first axis, of the first scanning station. Thereafter, the imaging unit is brought to a subsequent predefined static rotational positions around the imaging axis until the imaging unit is rotated to all predefined rotational positions around the imaging axis. At each of the subsequent predefined static rotational position, the imaging unit comprising at least one camera is configured to acquire one or more 2D images for each of different predefined static rotational positions, around the first axis, of the second scanning station. The acquired 2D images of the second dental object is used to generate 3D digital representation of the second dental object.

The imaging unit may include a thermostat configured to measure a temperature inside the imaging unit. The temperature must be kept stable within a few degrees after calibration because thermal expansion negatively impacts the optics of the imaging, and thereby, the scan accuracy. For this reason, a fan inside the imaging unit cools both the LED and a processing unit of the imaging unit. A heater inside the imaging unit may be used to quickly reach a thermal equilibrium after switching on a "cold" scanner. The thermostat, the fan and/or the heater may be arranged within the system, such as in the imaging unit, the base station and/or in the side surface. When placing the elements in the base station and/or in the side surface, the system may include wind and/or heat guiding means configured to guide the wind and/or the heat from the fan and heater, respectively, to the optics of the imaging unit. The guiding means may be tubes or heating wires.

The optics of the imaging unit, such as the at least one camera may be calibrated at a calibration temperature, and that temperature is stored in a memory of the system. The processor of the system may then be configured to control the thermostat.

Vibration of the system can be divided into at least two groups, a first group which includes internal vibrations that are caused by the moveable parts, and a second group which includes external vibrations that are caused by vibrations around the scanner. When the swing unit arm is turning to a new position and stops, vibrations are applied to the arm and then to the imaging unit, and therefore, it would not be suitable to start the scanning immediately after the arm has positioned. Thereby, the processor is configured to delay the start of a scanning after the arm has positioned. The processor may be configured to delay with a delay period an initiation of a scanning after the imaging unit is rotated into a static position. The delay period should be at least 25 milliseconds, at least 50 milliseconds, at least 1 seconds, at least 2 seconds or at least 4 seconds, or at least 8 seconds. The delay is for preventing the vibration caused by the stop to interfere with the scanning.

BRIEF DESCRIPTION OF THE DRAWINGS

The above and/or additional objects, features and advantages of the present invention, will be further described by the following illustrative and non-limiting detailed description of embodiments of the present invention, with reference to the appended drawing(s), wherein.

DETAILED DESCRIPTION OF DRAWINGS

In the following description, reference is made to the accompanying figures, which show by way of illustration how the invention may be practiced.

Figure 1:
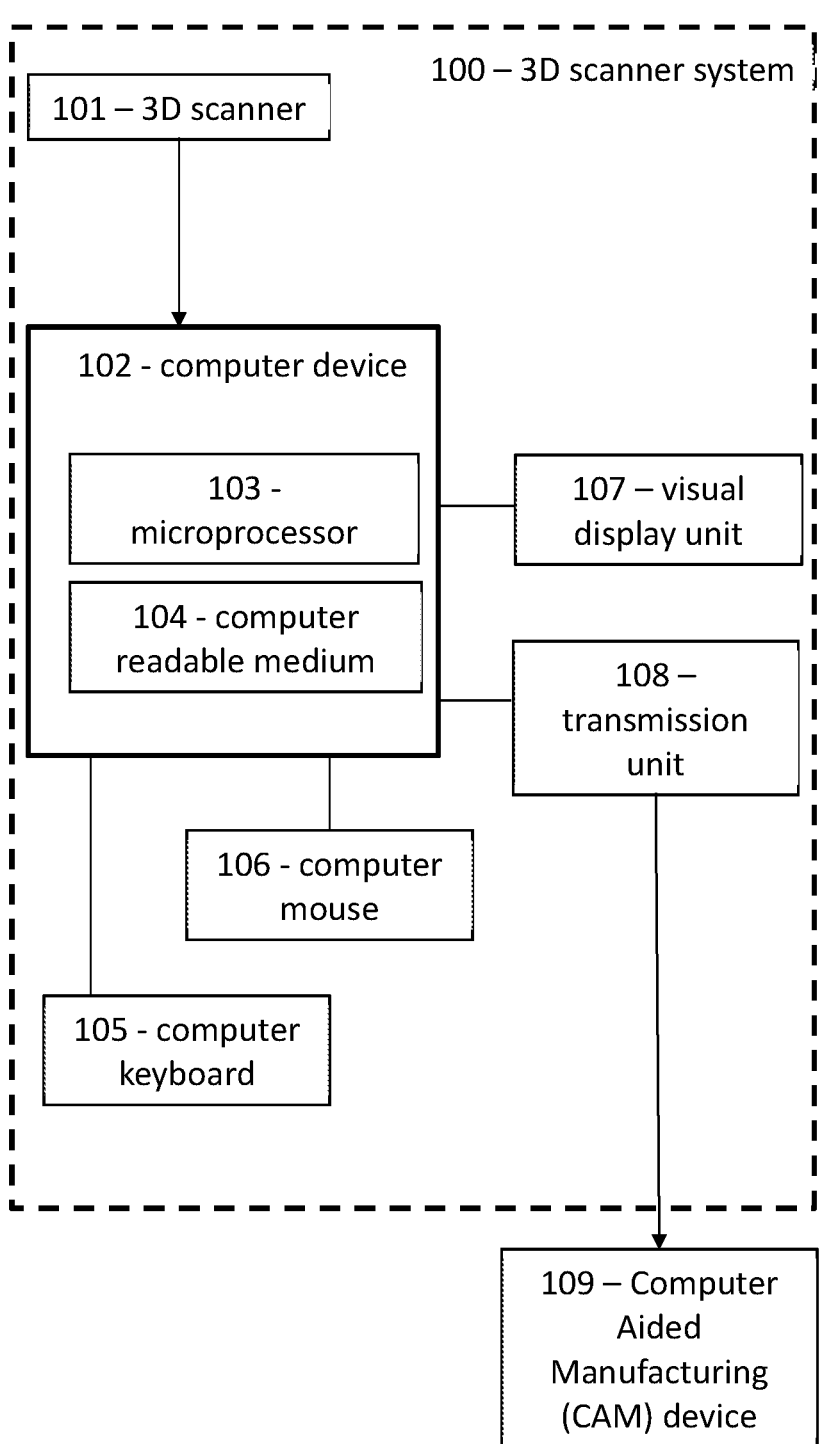
FIG. 1 shows a schematic of a 3D scanner system according to an embodiment of the disclosure.

FIG. 1 shows a schematic of a 3D scanner system according to an embodiment of the disclosure. The 3D scanner system 100 comprises a 3D scanner 101. The 3D scanner 101 includes the imaging unit, scanning stations, base station, preferably memory storing the predefined static relative positions, motors configured to control rotation of different components of the 3D scanner 101, control unit, processors such as the processor and/or second processor. The 3D scanner system 101 may be controlled by a computer device 102 comprising a computer readable medium 104 and a microprocessor 103, which may the third processor remote from the 3D scanner 101. The system further comprises a visual display unit 107, an input unit such as a computer keyboard 105, and possibly a computer mouse 106, for entering data and activating virtual buttons visualized on the visual display unit 107. The visual display unit 107 may for example be a computer screen.

The computer device 102 is configured to receive dental images from the 3D scanner 101, for example in the form of processed data as processed by the first processor of the 3D scanner 101. The computer device 102 is configured to receive any processed image for example processed images of a triple tray. Images may be stored in the computer readable medium 104, which may include memory, and provided to the processor 103. Generating the first 3D digital representation of the first 3D dental object based on the acquired 2D images I likely computationally intensive. Therefore, it is beneficial to send the 2D images, likely in a processed form, to a processor such as the third processor 103, where the intensive computations can be performed. That way, the 3D scanner 101 can be made relatively small and the system can be made quite cost-effective.

The computer device 102 may further include CAD software that may be used to digitally create a design of dental prosthodontic or orthodontic appliances based on the generated 3D digital representation of the dental object. The 3D scanner system 100 comprises a transmission unit 108 for storing and transmitting the result of the 3D scanner system 100 to a Computer Aided Manufacturing (CAM) device 109 for manufacturing the digitally designed dental prosthodontic or orthodontic appliances.

The result, i.e the 3D digital representation of the dental object or the design of the prosthodontic or orthodontic appliance may be visualised at the display unit 107. The unit for transmitting from the 3D scanner 101 to the computer device 102 or from the 3D scanner system 100 to CAM device 109 may be a wired or a wireless connection, and the transmission may be done for example using the internet or File Transfer Protocol (FTP).

The acquisition of a 3D dental scan of the physical dental object may be performed at a lab that has the 3D scanner system 100 or at another lab or facility with a 3D scanner 101. In the latter case, the dental image can be provided via an internet connection between the facility that acquired the image and the facility that will perform the processes of the computer device 102.

The computer device 102 may comprise more than one microprocessor 103 and/or more than one computer readable medium 104, the visual display unit 107 may be integrated in the computer device 102 or be separated from the computer device 102, etc.

Figures 2, 3:
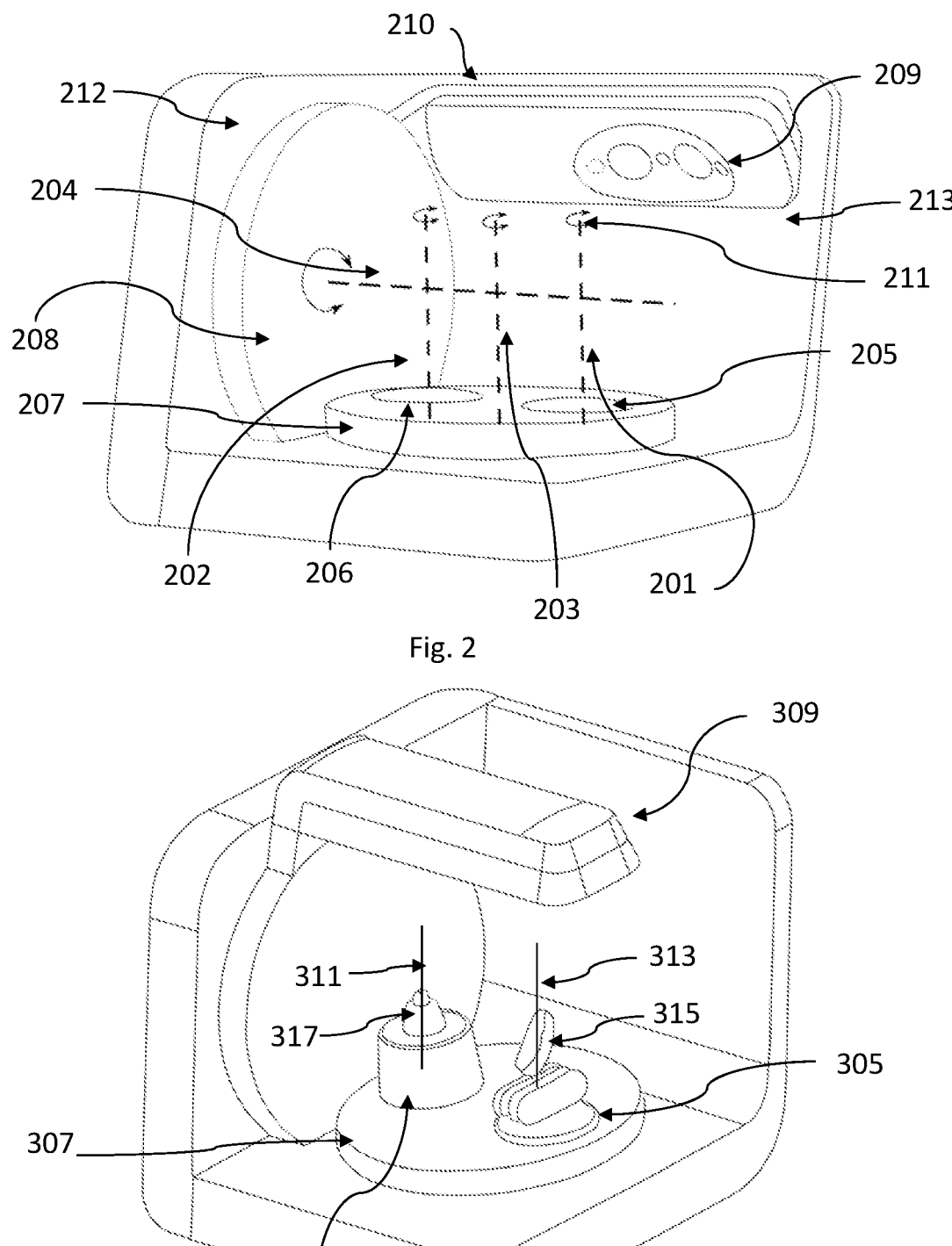
FIG. 2 shows a 3D scanner comprising different axes of rotations according to an embodiment.
FIG. 3 shows a 3D scanner with two dental objects, a single die of a tooth and a triple tray impression positioned at the respective scanning stations according to an embodiment.

FIG. 2 shows a 3D scanner comprising different axes of rotations according to an embodiment. In particular, the figure shows an embodiment of a 3D scanner (101, FIG. 1) with four axes of rotation. The scanner system includes a first scanning station 205, a second scanning station 206, a base station or a switching unit 207 and a swing unit 208 with a swing unit arm 210 with an imaging unit or an image acquisition unit 209. The first scanning station is configured to rotate around a first axis of rotation 201, the second scanning station is configured to rotate around a second axis of rotation 202, the base station is configured to rotate around a third axis of rotation 203 and the swing unit is configured to rotate around an imaging unit axis of rotation 204. As the imaging unit rotates with the swing unit, the imaging axis is configured to rotate around the imaging axis 204. By rotating the base station around the third axis of rotation 203, a first 3D dental object (not shown) positioned at the first scanning station 205 and a second 3D dental object (not shown) positioned at the second scanning station 206 can be moved interchangeably in and out of the field-of-view of the imaging unit 209. During scanning, the imaging unit is configured to rotate around the dental object positioned at the first scanning station and beyond a top position 211 that is exactly vertically above the first scanning station.

The system may include a partially open structure comprising one or more side surfaces 212, 213 and at least one opening. The side surface 212 may be used to attach the swing unit 208, or the side surface 213 may be used to restrict influence of stray light or restrict light from the imaging unit to be directed towards to one or more surfaces, such as directed only towards the one or more side surfaces 213 and base station 207. The at least one opening includes at least one side where the scanner surface is missing. This is illustrated by way of two open sides such as L-shaped open sides where surfaces are missing, i.e. is orthogonally adjacent to side surfaces 212 and 213. The at least one opening is configured to allow positioning of the at least one of the first dental object or second dental object at the first scanning station or second scanning station respectively. The open side may also include an open top side opposite to the base station. The open top side allows the swing unit to rotate such as above the side surfaces 212 and 213. Having a top surface would require at least one of the side surfaces to be dimensioned large enough to physically attach to the top surface. This would require additional surface, making the scanner heavier.

All component are configured to only rotate around their respective axis of rotation, and preferably be prevented from any translational movement. During the process of scanning, a 3D dental object is positioned at the scanning station, which rotates around its respective rotational axis allowing the imaging unit to view different areas of the object, thereby capturing dental information. During the short period when the imaging unit is acquiring a 2D image of the 3D dental object, preferably none of the first/second scanning station, base station, and the imaging unit is moving, i.e. these components are brought to a stationary state when the imaging unit and the scanning station(s) are at relative static positions. Of course, the first/second scanning station that is not within the field-of-view of the imaging unit 209 does not necessarily need to be at rest. However, it is preferred hat the scanning station that is not within the field of view is at rest to avoid any vibrations.

The base station 207 can rotate around its own axis which may result in the two scanning stations 205 and 206 changing positions in relation to the imaging unit 209. The imaging unit 209 may be positioned on the swing unit arm 210 away from the swing unit 208 closer to the end of the swing unit arm 208, or the swing unit arm 210 is dimensioned such that the swing unit arm extends fully only over one scanning station.

The angles between the imaging unit 209 and the scanning stations 205, 206 may be considered for the scanning process. The angles being defined by the relative static positions between the imaging unit and the scanning station. The static relative positions are based on at least one of stationary positions of the imaging unit (illustrated in FIG. 6) or stationary positions of the scanning station (illustrated in FIGS. 7A-7C). Acquiring images from these possible angles allows Field of View of the imaging unit to have a coverage of the object positioned at the scanning station. Coverage is here defined as the areas of the object that has been scanned with enough dental information that is sufficient collectively, for the plurality of static relative positions, to generate a digital 3D representation of the dental object. The coverage will affect the total number of static relative positions. The static relative positions may be dependent on the type of dental object desired to be scanned. For example, a dental impression may need to be viewed from different angles compared to a dental gypsum model to get the same amount of coverage.

The physical arrangement of the base station 207, first scanning station 205 and second scanning station 206 is such that the distance between the base station 207 and first scanning station 205, base station 207 and second scanning station 206, and first scanning station 205 and second scanning station 206 are predefined based on the distance between the third axis 203 and first axis 201, between the third axis 203 and second axis 202 and first axis 201 and second axis 202 respectively.

FIG. 3 shows a 3D scanner with two dental objects, a single die of a tooth and a triple tray impression positioned at the respective scanning stations according to an embodiment. Two different dental objects 315, 317 are placed on the first scanning station 305 and the second scanning station 306 respectively. The first scanning station 305 comprises a platform that secures the first dental object (e.g. triple tray 315) in a first orientation such that the tray axis 313 is parallel to the first axis. The first dental object is arranged is placed to ensure that the focus of the imaging unit 309 is focused on the first dental object within the scanning volume.

The static relative position between the imaging unit 309 and the scanning station 305, 306 may change depending on the type of dental object that is placed on the scanning stations 305 and 306. The second scanning station 306 includes a second dental object 317 in a second orientation such that the axis of symmetry 311 is parallel to the second axis around which the second scanning station is configured to rotate during scanning of the second dental object. The scanning stations are positioned on the base station 307, which is configured to rotate to sequentially, and preferably automatically, bring the scanning stations in the scan volume of the imaging unit so that the first dental object 315 and second dental object 317 can be sequentially scanned.

Figure 4:
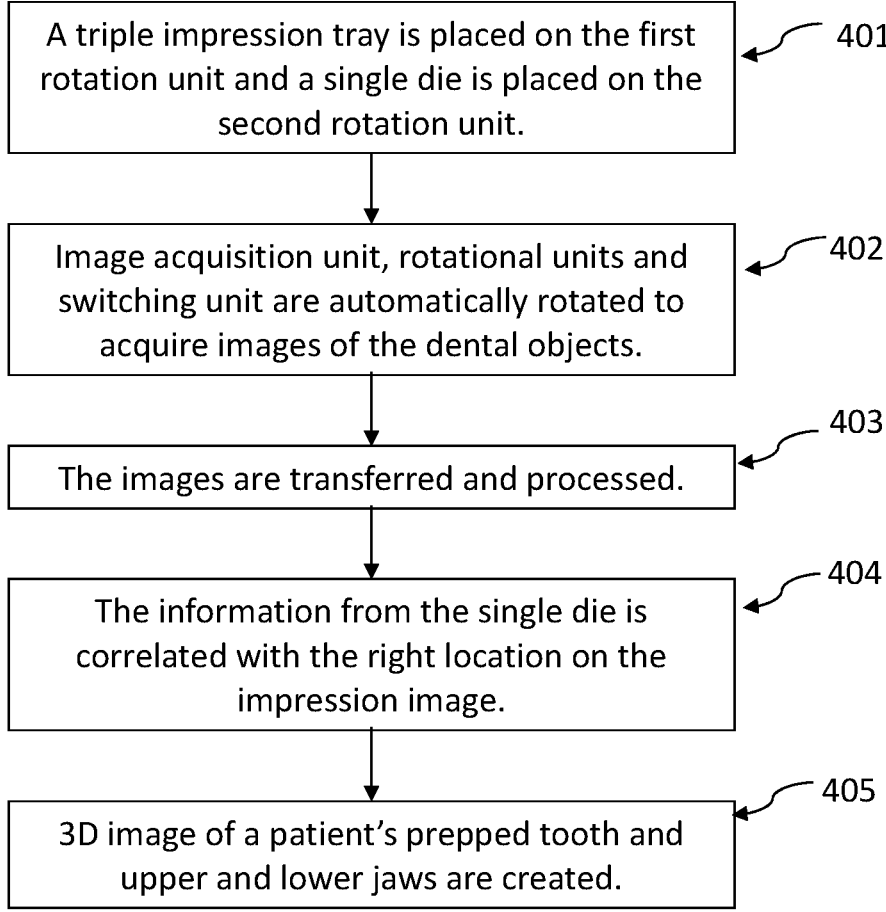
FIG. 4 shows a workflow according to an embodiment.

FIG. 4 shows a workflow for an embodiment. In step 401 the dental objects are placed on the first and the second scanning stations, respectively. The triple tray is placed on the first scanning station and the single die comprising a prepared tooth on the second scanning station. In step 402 the first scanning station and imaging unit are automatically rotated to bring them at stationary positions around respective rotational paths as prescribed by the set of predefined static relative positions regarding the triple tray stored on a storage unit and available to the control unit controlling the first scanning station and imaging unit. After scanning both sides of the triple tray, the base station is rotated 180° to bring the second scanning station within the scanning volume to facilitate scanning of the single die. The second scanning station and imaging unit are now automatically rotated to bring them at stationary positions around respective rotational paths as prescribed by the set of predefined static relative positions regarding the single die stored on the storage unit and available to the control unit controlling the first scanning station and imaging unit. The static relative positions for the triple tray are at least partly different from that of the single die. When both dental objects are scanned, the data will be transferred and processed on a computer in step 403. In the processing step the acquired data from the imaging unit will be analysed and 3D images of the dental objects created. In step 404 the scan of the single die comprising the prepared tooth will be correlated with the correct location of the prepared tooth on either the upper or lower jaw. Correlating the scan of the single die with data from the triple impression tray will result in a superimposed virtual image where the data from the single die is overlapped with the prepared tooth from the triple tray scan. Hereafter in step 405 the user will have a 3D image of the upper and lower jaw, with high quality of the prepared tooth with a good visibility of the margin line.

A triple tray will have information about the upper jaw, the lower jaw and the bite (relationship between the upper and lower jaw). The triple tray will contain information on both sides, and it is therefore necessary to scan both sides of the tray. A single die is a die of a prepared tooth. The single die is a positive model while the triple tray is a negative model of the dental situation. This explains why the angles for scanning the two dental objects have to be different, also why it is useful to have the imaging unit and the scanning stations at the plurality of static relative positions to allow capturing dental information from different sides of the scanned dental object, esp. triple tray.

Figure 5:
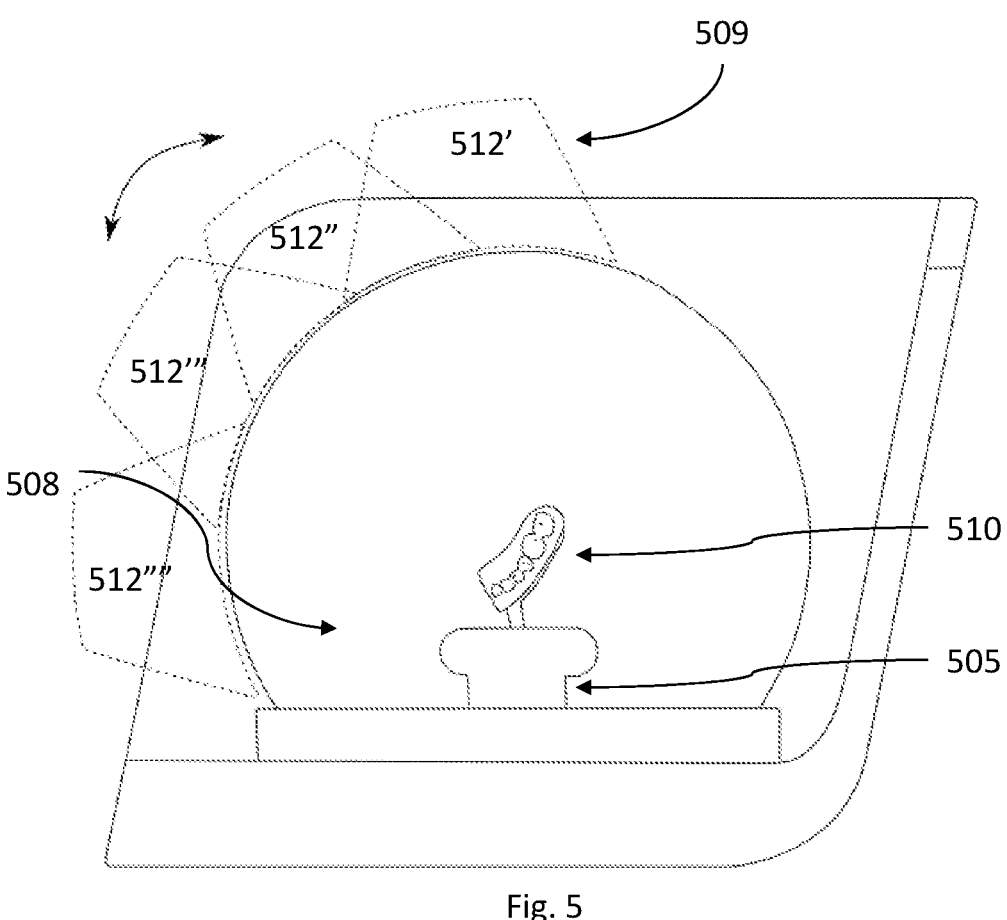
FIG. 5 shows a side view of a scanner with a first scanning station and visualises rotations of the imaging unit according to an embodiment.

FIG. 5 shows a side view of a scanner with a first scanning station and visualises rotations of the imaging unit according to an embodiment. The different static rotational positions for the imaging unit 509 are illustrated by 4 different positions (512'-512"") created by rotating the swing unit 508 around the imaging unit axis of rotation (204, FIG. 2). While the imaging unit 509 is in one position, the first scanning station with a dental object 510 may rotate around the first axis of rotation 601 and brought to different static rotational position of the scanning station 505, the different static rotational position of the scanning station corresponding to the scanned physical dental object 510.

Figure 6:
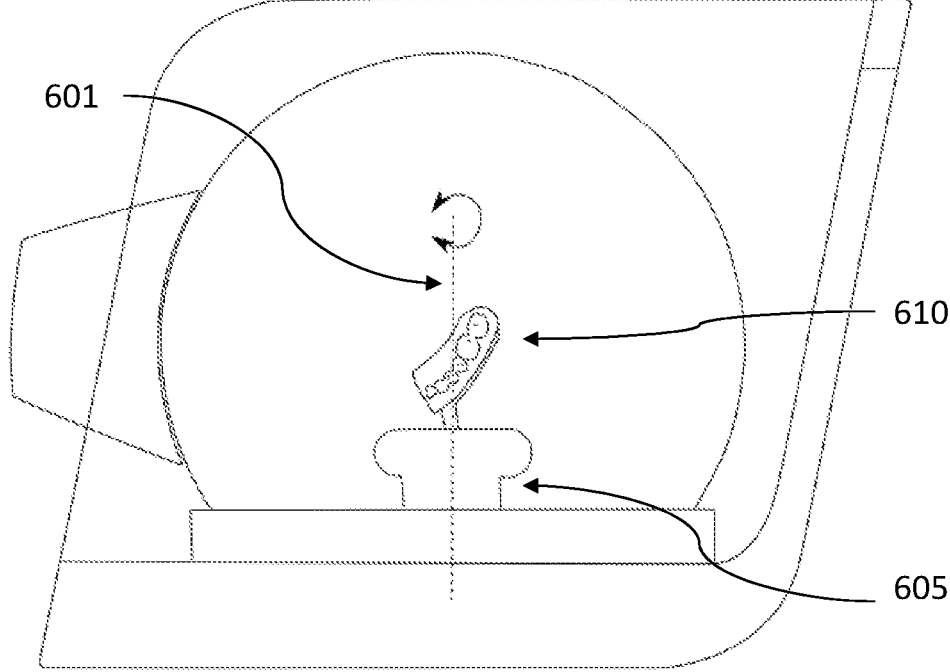
FIG. 6 shows a side view of a scanner and visualises rotations of the first scanning station according to an embodiment.

FIG. 6 shows a side view of a scanner according to an embodiment. The figure illustrates a scanning station 605 having a dental object 610 positioned thereon. During scanning, the scanning station is configured to rotate such that the scanning station 605 is brought to rest at different static rotational positions around the first axis of rotation 601.

Figures 7A, 7B, 7C:
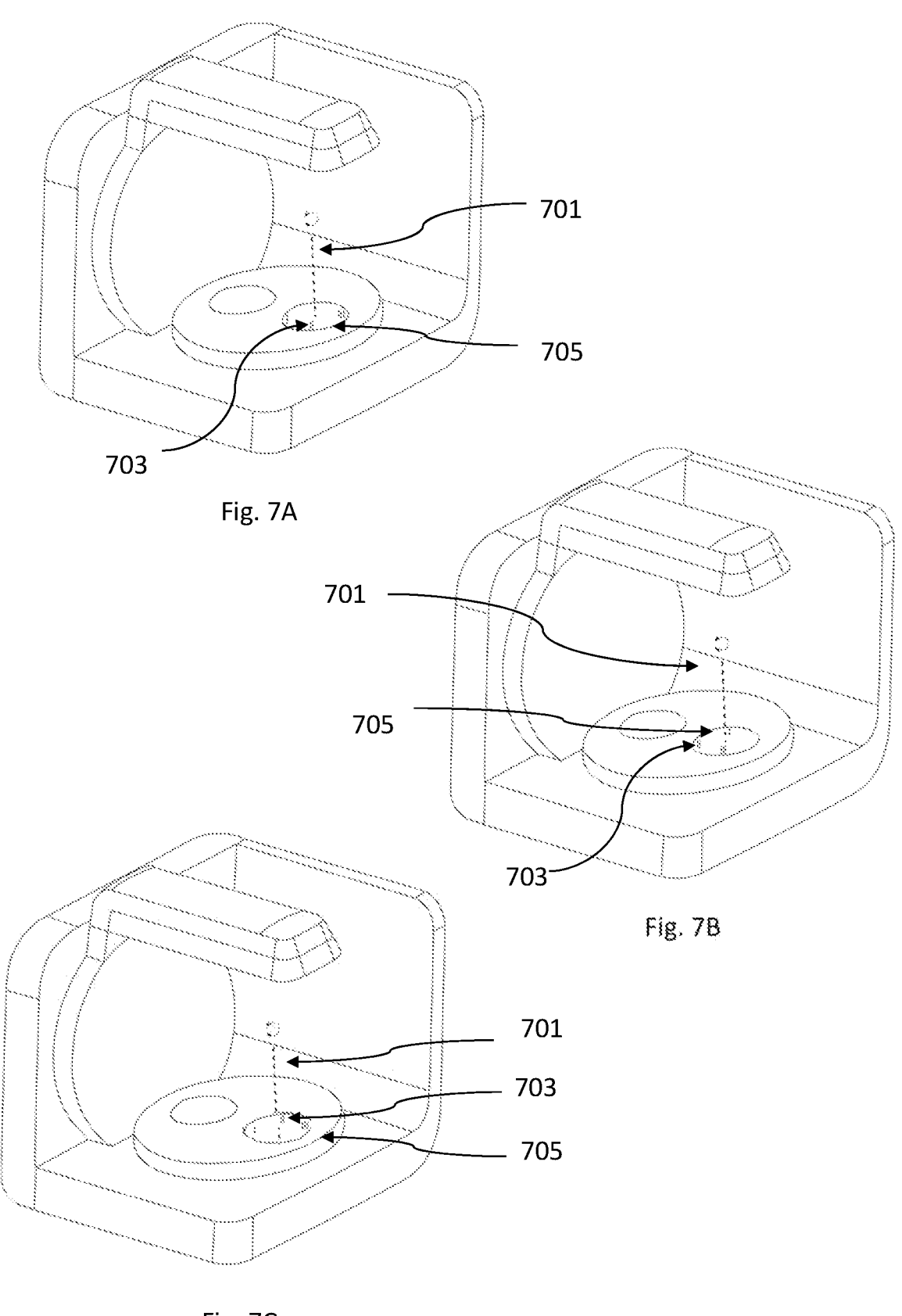
FIG. 7A-7C show different views of the scanner with the first scanning station in different positions according to an embodiment.

FIG. 7A-7C show different views of the scanner with the first scanning station in different positions according to an embodiment. During scanning, the scanning station 705 is configured to rotate around the first axis 701. The scanner need not have a scanner but to illustrate the rotation three different markers (I, II, III) are drawn on the top of the scanning station 705. For simplicity, a dental object is not placed on the scanning station 705. In FIG. 7B, the first scanning station 705 has been rotated 90° clockwise compared to the position in FIG. 7A. In FIG. 7C, the first scanning station 705 has been further rotated 90° clockwise compared to the position in FIG. 7B. This further illustrated by indicating the 90° clockwise movement of II (703).

Examples

Workflow

The workflow for scanning a first 3D dental object using the 3D optical scanning system starts with the user placing the first 3D dental object like a triple tray on the first scanning station and a corresponding single die of the same patient or multiple die fixture of the same patient on the second scanning station. The triple tray may have the shape of a "U" and the triple tray is preferably positioned vertically with the opening of the "U" facing upwards, or a partial U shape, as illustrated in the accompanying FIG. 3.

The user places the triple tray, so the side with the preparation is placed toward the imaging unit. Before starting the scan, the user specifies which dental object is placed on which scanning station. This may allow for the side with the preparation to undergo two scans: first, a preview scan obtained at a lower resolution. After this preview scan, the user marks the preparation in the preview scan. After annotation, the second scan of the triple tray is taken whereby at least part of the dental object corresponding to the annotated section is scanned at a higher resolution. Lastly, the die is scanned. After scanning, the user may create at least any missing trimline in the first 3d digital representation on both sides of the impression of the triple tray. A digital alignment between the first 3D digital representation of the triple tray and the second 3D digital representation of the die is done automatically by the third processor, which may be based on the third processor identifying corresponding points using known feature recognition techniques. If this digital alignment fails, the user can manually digitally align the first 3D digital representation and the second 3D digital representation by either using one-point alignment or three-point alignment that refers to identifying corresponding points on the two 3D digital representations and aligning by applying known techniques such as Iterative Closest Point (ICP) for alignment. Preferably the corresponding points relate to margin line of the preparation in the two 3D digital representations. The allows for a good fit between the two digital representations and based on the scanned margin line.

Automated Workflow

Two related dental objects (e.g. a triple tray and a single die) positioned on two different scanning stations are sequentially scanned in an uninterrupted way, i.e. there is a set of predefined static relative positions between the scanning station and the imaging unit used for each of the triple tray and the single die, and the scanning stations are sequentially brought in field of view so that the two dental objects can be scanned. Interestingly, the triple tray is vertically positioned on respective scanning station so that position of the triple tray relative to the scanning station remains the same during the scanning—some prior art scanner flip the triple tray manually so that two sides can be scanned whereas in the present invention, the rotational movement of the scanning station and imaging unit allows the vertically positioned triple tray to be scanned without a need to manually change triple tray position during scanning.

The scanner is operating such that data is captured at as determined by the set of the predefined static relative positions (i.e. stationary positions), which are determined by type of object being scanned. The static relative positions can be determined based on previous cases where a set of predefined static relative positions of a same or similar dental object type as the dental object being scanned is determined. The set of predefined static relative positions are stored in a memory that can be accessed. Based on the manually or automatic identification of the object type to be scanned, the scanner is configured to access the set of the predefined static relative positions from the memory and brings the imaging unit and scanning station having the dental object thereon at relative static positions assigned to the object type in the memory.

Steps

The user places a triple impression tray in the vertical impression fixture on one of the scanning stations and a single die on the other scanning station. The scanner identifies that there is a triple impression tray and a single die placed in the scanner. This is done by rotating the base into the field of view of the camera which continuously will take a several test images. The several test images are evaluated, e.g. by applying known image analysis techniques such as feature recognition techniques, to identify the dental object type. The scanner will also detect the prepared tooth site from the same or different test images. When all this necessary information is analyzed and the dental object type is identified with or without identification of prepared tooth site, the scanner will start scanning the first dental object such as prepared tooth site of the first dental object. Lastly, the scanner will rotate the base and may perform the identification of the dental object type with or without identification of the prepared tooth side. When all this necessary information is analyzed and the dental object type is identified with or without identification of prepared tooth site, the scanner will start scanning the second dental object such as prepared tooth site of the second dental object. At the end of the process, first digital 3D digital representations of the first dental object and second digital 3D digital representations of the second dental object are generated. These digital representations can be co-related and used to digitally design prosthodontic or orthodontic appliances.

List of Items

1. A three-dimensional optical scanning system for scanning a three-dimensional dental object, the system comprising a first scanning station configured to receive a first three-dimensional dental object, and further configured to rotate around a first axis during the scanning; and an imaging unit comprising at least one camera and configured to rotate around an imaging unit axis during the scanning, wherein the optical scanning system is configured such that the imaging unit acquires a plurality of two-dimensional images of the first three-dimensional dental object corresponding to a set of predefined static relative positions between the imaging unit and the first scanning station for generating a first three-dimensional digital representation of the first three-dimensional dental object.

2. The system according to item 1, wherein the set of predefined static relative positions are selected from a plurality of sets of predefined static relative positions between the imaging unit and the first scanning station.

3. The system according to any of the preceding items, wherein each predefined static relative position from the set of predefined static relative positions comprises a pairing of a first predefined static rotational position of the first scanning station around the first axis with a second predefined static rotational position of the imaging unit around the imaging unit axis.

4. The system according to any of the preceding items, wherein a selection of the set of predefined static relative positions from the plurality of sets of predefined static relative positions is based on a dental object type of the first three-dimensional dental object.

5. The system according to any of the preceding items, wherein the set of predefined static relative positions comprises i) intermediate predefined static rotational positions of the imaging unit between two extreme positions around the imaging unit axis or ii) intermediate predefined static rotational positions of the imaging unit between two extreme positions and at least one of the two extreme positions around the imaging unit axis.

6. The system according to any of the preceding items, wherein the imaging unit is movable between two extreme positions that are spaced apart around the imaging unit axis by a predefined angle.

7. The system according to any of the preceding items, wherein the two extreme positions are substantially symmetrically apart from the first axis.

8. The system according to any of the preceding items, wherein at least one of the predefined static rotational positions of the imaging unit and/or at least one of the predefined static rotational positions of the first scanning station is/are based on previous cases comprising dental objects corresponding to the first three-dimensional dental object.

9. The system according to any of the preceding items, wherein the at least one of the predefined static rotational positions of the imaging unit and/or the at least one of the predefined static rotational positions of the first scanning station is/are determined using machine learning.

10. The system according to any of the preceding items, wherein the first scanning station comprises a platform that is configured to receive the first three-dimensional dental object in a first orientation.

11. The system according to any of the preceding items, wherein the first scanning station comprises a platform that is configured to receive the first three-dimensional dental object in a first orientation, such that patient dental information or all patient dental information comprised on each of opposite sides of the first three-dimensional dental object is exposed based on the set of predefined static relative positions.

12. The system according to any of the preceding items, wherein the plurality of predefined static relative positions comprises positions of the first scanning station of discrete multiples of a first angle around the first axis, wherein the first angle is more than 10°, preferably more than 20°, more preferably more than 30°, and most preferably more than 40°.

13. The system according to any of the preceding items, wherein the plurality of predefined static relative positions comprises positions of the imaging unit of discrete multiples of a second angle around the imaging unit axis, wherein the second angle is more than 10°, preferably more than 20°, more preferably more than 30°, and most preferably more than 40°.

14. The system according to any of the preceding items, wherein the system is configured to maintain the imaging unit and the first scanning station at stationary states when at respective static positions during acquisition of the plurality of two-dimensional images of the first three-dimensional dental object.

15. The system according to any of the preceding items, wherein the system is configured to rotate the imaging unit to a predefined static rotational position around the imaging axis and to rotate the first scanning station to different predefined static rotational positions around the first axis when the imaging unit is stationary at the predefined static rotational position, prior to rotating the imaging unit to a subsequent predefined static rotational position around the imaging axis.

16. The system according to any of the preceding items 1-14, wherein the system is configured to rotate the first scanning station to a static rotational position around the first axis and to rotate the imaging unit to different predefined static rotational positions around the imaging axis when the scanning station is stationary at the static rotational position, prior to rotating the first scanning station to a subsequent predefined static rotational position around the first axis.

17. The system according to any of the preceding items, wherein the rotational speed of the first scanning station and/or of the imaging unit is/are varied automatically or by a user.

18. The system according to any of the preceding items, further comprising a first motor and an imaging unit motor, wherein the system is configured to control the first motor to rotate the first scanning station around the first axis and to control the imaging unit motor to rotate the imaging unit around the imaging unit axis independently.

19. The system according to any of the preceding items, further comprising a control unit configured to control rotation of the first scanning station around the first axis and the imaging unit around the imaging unit axis.

20. The system according to any of the preceding items, wherein for each predefined static relative position of the imaging unit, the control unit is configured to instruct the first motor to rotate the first scanning station sequentially to each of the plurality of predefined static rotational positions of the first scanning station.

21. The system according to any of the preceding items, further comprising a memory configured to store the set of predefined static relative positions specific to a dental object type corresponding to the first three-dimensional dental object, or plurality of sets of predefined static relative positions specific to a plurality of dental object types.

22. The system according to any of the preceding items, further comprising a processor configured to access the memory and to apply, during the scanning, the stored set of static relative positions in response to identification of a dental object type corresponding to the first three-dimensional dental object.

23. The system according to any of the preceding items, wherein the system comprises at least one light source configured to emit light for illuminating the received first three-dimensional dental object.

24. The system according any of the preceding items, wherein the light comprises structured light that is configured to be projected onto the first three-dimensional dental object.

25. The system according to any of the preceding items, wherein the structured light has a pattern corresponding to at least one of a physical structure introduced in light path between the at least one light source and the first three-dimensional dental object, a digitally generated light pattern, or relative arrangement of more than one light source representing the at least one light source.

26. The system according to any of the preceding items, further comprising a second processor configured to generate processed data by processing the plurality of two-dimensional images, wherein the first three-dimensional digital representation of the first three-dimensional dental object is generated based on the processed data.

27. The system according to any of the preceding items, further comprising a third processor configured to generate the first three-dimensional digital representation of the first three-dimensional dental object is generated based on the plurality of two-dimensional images.

28. The system according to any of the preceding items, wherein the first axis is substantially vertical.

29. The system according to any of the preceding items, further comprising a base station comprising the first scanning station that is arranged on the base station, wherein the base station is configured to rotate around a third axis.

30. The system according to any of the preceding items, wherein the first scanning station is at a fixed distance from the third axis of rotation.

31. The system according to any of the preceding items, wherein the fixed distance is along a lateral surface of the base station, the lateral surface comprises a surface on which the first scanning station is arranged.

32. The system according to any of the preceding items, wherein the fixed distance between the first scanning station and the third axis of rotation comprises a distance between the first axis and the third axis.

33. The system according to any of the preceding items, wherein the first axis and the third axis are substantially parallel.

34. The system according to any of the preceding items, further comprising a second scanning station arranged on the base station, the second scanning station being configured to receive a second three-dimensional dental object and to rotate around a second axis during scanning of the second three-dimensional dental object.

35. The system according to any of the preceding items, wherein the second scanning station is at a fixed distance from the first scanning station, the fixed distance being defined by a distance between the first axis and the second axis.

36. The system according to any of the preceding items, wherein the first axis and the second axis are substantially parallel.

37. The system according to any of the preceding items, wherein the first scanning station comprises a first scanning station surface configured to receive the first three-dimensional dental object, wherein the first axis and a normal to the first scanning station surface are at least substantially parallel.

38. The system according to any of the preceding items, wherein the first axis is non-parallel to the imaging unit axis.

39. The system according to any of the preceding items, wherein the first axis is at least substantially perpendicular to the imaging unit axis.

40. The system according to any of the preceding items, wherein the first scanning station is prevented from rotating around an axis perpendicular to the first axis.

41. The system according to any of the preceding items, wherein the first scanning station is restricted to rotate only around the first axis and/or third axis.

42. The system according to any of the preceding items, wherein the base station is restricted to rotate only around the third axis.

43. The system according to any of the preceding items, wherein the imaging unit is restricted to rotate only around the imaging unit axis.

44. The system according to any of the preceding items, wherein the imaging unit is configured to define a scan volume through rotation of the imaging unit around the imaging unit axis during the scanning.

45. The system according to any of the preceding items, wherein the predefined static relative positions comprise predefined static rotational positions of the imaging unit operationally paired with predefined static rotational positions of the first scanning station, wherein the defined scan volume comprises a plurality of separate scan volumes, wherein each separate scan volume corresponds to each predefined static rotational position of the plurality of predefined static rotational positions of the imaging unit.

46. The system according to any of the preceding items, wherein the scan volume comprises field of views of the imaging unit positioned at the plurality of predefined static rotational positions along the rotational path around the imaging unit axis.

47. The system according to any of the preceding items, wherein the imaging unit comprises two or more cameras; and the scan volume comprises at least partly overlapping field of views of the two or more cameras.

48. The system according to any of the preceding items, wherein the imaging unit comprises at least one camera and at least one light source, the at least one camera and the at least one light source are in a predefined spatial relation with respect to each other.

49. The system according to any of the preceding items, wherein the imaging unit is configured to capture the projected pattern of the structured light and/or distortion thereof, wherein the captured projected pattern and/or distortions thereof correspond to the static relative positions and the predefined spatial relation between the imaging unit and the first scanning station.

50. The system according to any of the preceding items, wherein prior to rotating the imaging unit to a subsequent predefined static rotational position around the imaging unit axis, the imaging unit is configured to acquire at least one two-dimensional image of the first three-dimensional dental object for each predefined static relative position of the set of predefined static relative positions.

51. The system according to any of the preceding items, wherein the control unit is configured to control a third motor to prevent rotation of the base station around the third axis during the scanning of the first three-dimensional dental object.

52. The system according to any of the preceding items, wherein the base station is configured to be stationary during the scanning of the first three-dimensional dental object.

53. The system according to any of the preceding items, wherein the system is configured such that at the predefined static relative positions the focus of the imaging unit within the scan volume is limited to the first three-dimensional dental object positioned at the first scanning station and/or only part of the base station.

54. The system according to any of the preceding items, wherein the system comprises a partially open structure comprising one or more surfaces and at least one opening, the imaging unit comprises the at least one light source, and the system is configured for controlling the imaging unit such that during the rotation of the imaging unit around the imaging unit axis, the light from the at least one light source is restricted to be directed towards the one or more surfaces of the partially open structure, and/or field of view of the imaging unit is restricted to be faced towards one or more surfaces of the partially open structure.

55. The system according to any of the preceding items, wherein the third motor is configured to rotate the base station around the third axis.

56. The system according to any of the preceding items, wherein the control unit is configured to control the third motor to rotate the base station around the third axis such that, prior to scanning of the first three-dimensional dental object, the first scanning station of the plurality of scanning stations is brought within the scan volume.

57. The system according to any of the preceding items, wherein the optical scanning system is configured to rotate the base station around the third axis to sequentially bring the first scanning station and the second scanning station within the scan volume; and the optical scanning system is configured such that the imaging unit acquires a plurality of second two-dimensional images of the second three-dimensional dental object corresponding to a second set of predefined static relative positions between the imaging unit and the second scanning station for generating a second three-dimensional digital representation of the second three-dimensional dental object.

58. The system according to any of the preceding items, wherein the set of predefined static relative positions and the second set of predefined static relative positions are same or at least partly different.

59. The system according to any of the preceding items, wherein the processor is configured to generate a second three-dimensional digital representation of the second three-dimensional dental object based on the plurality of second two-dimensional images of the second three-dimensional dental object.

60. The system according to any of the preceding items, wherein the first three-dimensional dental object and the second three-dimensional dental object correspond to a same patient and are a triple tray impression and a single die of said same patient.

61. The system according to any of the preceding items, wherein the optical scanning system is configured to control the third motor to rotate the base station around the third axis to bring the second scanning station within the scan volume after acquisition of the plurality of two-dimensional images of the first three-dimensional dental object received at the first scanning station.

Although some embodiments have been described and shown in detail, the disclosure is not restricted to such details, but may also be embodied in other ways within the scope of the subject matter defined in the following claims. In particular, it is to be understood that other embodiments may be utilized, and structural and functional modifications may be made without departing from the scope of the present invention.

Benefits, other advantages, and solutions to problems have been described herein with regard to specific embodiments. However, the benefits, advantages, solutions to problems, and any component(s)/unit(s) that may cause any benefit, advantage, or solution to occur or become more pronounced are not to be construed as critical, required, or essential features or components/elements of any or all the claims or the invention. The scope of the invention is accordingly to be limited by nothing other than the appended claims, in which reference to an component/unit/element in the singular is not intended to mean "one and only one" unless explicitly so stated, but rather "one or more." A claim may refer to any of the preceding claims, and "any" is understood to mean "any one or more" of the preceding claims.

As used, the singular forms "a," "an," and "the" are intended to include the plural forms as well (i.e. to have the meaning "at least one"), unless expressly stated otherwise to be limited to "only" one/single. It should be emphasized that the term "comprises/comprising/including/having" when used in this specification is taken to specify the presence of stated features, integers, operations, steps or components but does not preclude the presence or addition of one or more other features, integers, steps, components or groups thereof. As used herein, the term "and/or" includes any and all combinations of one or more of the associated listed items. The steps of any disclosed method are not limited to the exact order stated herein, unless expressly stated otherwise.

In claims enumerating several means, several of these means can be embodied by one and the same item of hardware. The mere fact that certain measures are recited in mutually different dependent claims or described in different embodiments does not indicate that a combination of these measures cannot be used to advantage.

The invention claimed is:

1. A three-dimensional optical scanning system for scanning a three-dimensional dental object, the system comprising:

a first scanning station of a plurality of scanning stations configured to receive a first three-dimensional dental object, and further configured to rotate around a first axis during the scanning;

a second scanning station of the plurality of scanning stations configured to receive a second three-dimensional dental object, and further configured to rotate around a second axis during the scanning; and an imaging unit comprising at least one camera and configured to rotate around an imaging unit axis during the scanning, a base station including the first scanning station and the second scanning station arranged on the base station, wherein the base station is configured to rotate around a third axis;

a control unit configured to control a third motor to rotate the base station around the third axis such that, prior to scanning of the first three-dimensional dental object, the first scanning station of the plurality of scanning stations is brought within a scan volume, and wherein the optical scanning system is configured such that the imaging unit acquires a plurality of two-dimensional images of the first three-dimensional dental object corresponding to a set of predefined static relative positions between the imaging unit and the first scanning station for generating a first three-dimensional digital representation of the first three-dimensional dental object, and wherein the optical scanning system is configured to control the third motor to automatically rotate the base station around the third axis to bring the second scanning station within the scan volume after acquisition of the plurality of two-dimensional images of the first three-dimensional dental object received at the first scanning station.

2. The scanning system according to claim 1, wherein each predefined static relative position from the set of predefined static relative positions comprises a pairing of a first predefined static rotational position of the first scanning station around the first axis with a second predefined static rotational position of the imaging unit around the imaging unit axis.

3. The system according to claim 1, wherein the imaging unit is movable between two extreme positions that are spaced apart around the imaging unit axis by a predefined angle; and the set of predefined static relative positions comprises i) intermediate predefined static rotational positions of the imaging unit between two extreme positions around the imaging unit axis or ii) intermediate predefined static rotational positions of the imaging unit between two extreme positions and at least one of the two extreme positions around the imaging unit axis.

4. The system according to claim 3, wherein at least one of the predefined static rotational positions of the imaging unit and/or at least one of the predefined static rotational positions of the first scanning station is/are based on previous cases where a set of predefined static relative positions of a same or similar dental object type as the three-dimensional dental object being scanned is determined.

5. The system according to claim 3, wherein the scan volume comprises field of views of the imaging unit positioned at the set of predefined static rotational positions along a rotational path around the imaging unit axis.

6. The system according to claim 1, wherein the first scanning station comprises a platform that is configured to receive the first three-dimensional dental object in a first orientation, such that patient dental information or all patient dental information comprised on each of opposite sides of the first three-dimensional dental object is exposed based on the set of predefined static relative positions.

7. The system according to claim 1, wherein the system is configured to maintain the imaging unit and the first scanning station at stationary states when at respective static positions during acquisition of the plurality of two-dimensional images of the first three-dimensional dental object.

8. The system according to claim 1, wherein the system is configured to rotate the imaging unit to a predefined static rotational position around the imaging axis and to rotate the first scanning station to different predefined static rotational positions around the first axis when the imaging unit is stationary at the predefined static rotational position, prior to rotating the imaging unit to a subsequent predefined static rotational position around the imaging axis; or rotate the first scanning station to a static rotational position around the first axis and to rotate the imaging unit to different predefined static rotational positions around the imaging axis when the first scanning station is stationary at the static rotational position, prior to rotating the first scanning station to a subsequent predefined static rotational position around the first axis.

9. The system according to claim 1, further comprising a memory configured to store the set of predefined static relative positions specific to a dental object type corresponding to the first three-dimensional dental object, or plurality of sets of predefined static relative positions specific to a plurality of dental object types, the plurality of sets of predefined static relative positions are at least partly different; and a processor configured to access the memory and to apply, during the scanning, the stored set of static relative positions in response to identification of a dental object type corresponding to the first three-dimensional dental object.

10. The system according to claim 1, further comprising a partially open structure comprising one or more surfaces and at least one opening, the imaging unit comprises at least one light source, and the system is configured for controlling the imaging unit such that during the rotation of the imaging unit around the imaging unit axis, the light from the at least one light source is restricted to be directed towards the one or more surfaces of the partially open structure, and/or field of view of the imaging unit is restricted to be faced towards one or more surfaces of the partially open structure.

11. The system according to claim 1, wherein the optical scanning system is configured to rotate the base station around the third axis to sequentially bring the first scanning station and the second scanning station within the scan volume; and the optical scanning system is configured such that the imaging unit acquires a plurality of second two-dimensional images of the second three-dimensional dental object corresponding to a second set of predefined static relative positions between the imaging unit and the second scanning station for generating a second three-dimensional digital representation of the second three-dimensional dental object.

12. The system according to claim 1, wherein the optical scanning system is configured to control the third motor to rotate the base station around the third axis to bring the second scanning station within the scan volume after acquisition of the plurality of two-dimensional images of the first three-dimensional dental object received at the first scanning station.

13. The system according to claim 1, comprising a processor configured to delay with a delay period an initiation of a scanning after the imagining unit is rotated into a static position.

14. A three-dimensional optical scanning system for scanning a three-dimensional dental object, the system comprising a first scanning station configured to receive a first three-dimensional dental object, and further configured to rotate around a first axis during the scanning; and an imaging unit comprising at least one camera and configured to rotate around an imaging unit axis during the scanning, wherein:

the optical scanning system is configured such that the imaging unit acquires a plurality of two-dimensional images of the first three-dimensional dental object corresponding to a set of predefined static relative positions between the imaging unit and the first scanning station for generating a first three-dimensional digital representation of the first three-dimensional dental object, the system further comprising:

a thermostat configured to measure a temperature inside the imaging unit, a fan configured to cool the at least one camera of the imaging unit, a heater configured to heat the at least one camera of the imaging unit, and a processor configured to control the fan and heater based on the measured temperature.

15. The system according to claim 14, comprising a memory, and wherein the memory includes a calibration temperature of the imaging unit, and the processor is configured to control the fan and the heater such that the measured temperature inside the imaging unit is targeting the stored calibration temperature.

* * * * *